United States Patent
Gräf

(10) Patent No.: US 11,584,216 B2
(45) Date of Patent: Feb. 21, 2023

(54) COOLING CIRCUIT ARRANGEMENT

(71) Applicant: Dr. Ing. h.c. F. Porsche Aktiengesellschaft, Stuttgart (DE)

(72) Inventor: Lars Gräf, Weissach (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 373 days.

(21) Appl. No.: 17/069,992

(22) Filed: Oct. 14, 2020

(65) Prior Publication Data
US 2021/0138890 A1 May 13, 2021

(30) Foreign Application Priority Data
Nov. 12, 2019 (DE) ...................... 10 2019 130 429.6

(51) Int. Cl.
| B60K 11/04 | (2006.01) |
| B60K 11/02 | (2006.01) |
| B60L 58/24 | (2019.01) |
| B60K 1/00 | (2006.01) |

(52) U.S. Cl.
CPC .............. B60K 11/04 (2013.01); B60K 11/02 (2013.01); B60L 58/24 (2019.02); *B60K 2001/005* (2013.01); *B60K 2001/006* (2013.01)

(58) Field of Classification Search
CPC .. B60K 11/04; B60K 11/02; B60K 2001/005; B60K 2001/006; B60K 1/00; B60L 58/24
See application file for complete search history.

(56) References Cited

U.S. PATENT DOCUMENTS

| 10,046,617 B2 | 8/2018 | Smith et al. |
| 2013/0175022 A1* | 7/2013 | King ...................... B60L 50/62 237/12.3 B |
| 2014/0326430 A1* | 11/2014 | Carpenter .......... B60H 1/00278 165/41 |

(Continued)

FOREIGN PATENT DOCUMENTS

| CN | 209492374 U | * 10/2019 |
| DE | 102014201747 A1 | 8/2014 |

(Continued)

OTHER PUBLICATIONS

"Thermal Management of Vehicles with Electric Drive", Prosche Engineering Magazine with partial translation, 2011, pp. 34-36.

*Primary Examiner* — James A Shriver, II
*Assistant Examiner* — Michael T. Walsh
(74) *Attorney, Agent, or Firm* — RatnerPrestia

(57) ABSTRACT

A cooling circuit arrangement includes first and second closed cooling circuits. Each closed cooling circuit has a heat source, a pump and a radiator. By way of the first pump of the first circuit, a coolant can be conveyed to the first radiator and from the first radiator to the first heat source and from the latter to the first pump. By way of the second pump of the second circuit, a coolant can be conveyed to the second radiator and can be conveyed from the second radiator to the second heat source and from the latter to the second pump. Downstream of the first pump and of the second pump, there is provided a first fluidic connection which is controllable by a first valve. Upstream of the first pump and the second pump, there is provided a second fluidic connection which is controllable by a second valve.

10 Claims, 2 Drawing Sheets

(56) References Cited

U.S. PATENT DOCUMENTS

Figure 1:
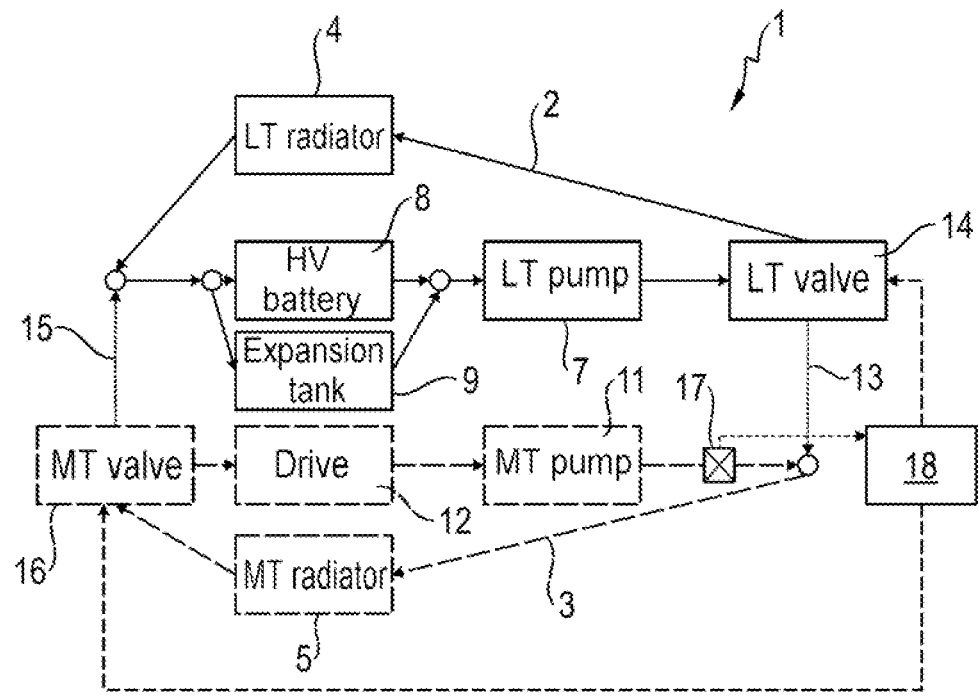

| | | | |
|---|---|---|---|
| 2014/0338376 A1* | 11/2014 | Carpenter | ............... B60L 50/51 62/115 |
| 2015/0333379 A1 | 11/2015 | Janarthanam et al. | |
| 2016/0031288 A1 | 2/2016 | Nishikawa et al. | |

FOREIGN PATENT DOCUMENTS

| | | | |
|---|---|---|---|
| DE | 102014115377 A1 * | 4/2015 | ............. B60L 3/003 |
| EP | 2392486 A2 | 12/2011 | |

\* cited by examiner

COOLING CIRCUIT ARRANGEMENT

CROSS-REFERENCE TO RELATED APPLICATION

This application claims priority to German Patent Application No. 10 2019 130 429.6, filed Nov. 12, 2019, the content of such application being incorporated by reference herein in its entirety.

FIELD OF THE INVENTION

The invention relates to a cooling circuit arrangement, in particular of a motor vehicle.

BACKGROUND OF THE INVENTION

Cooling circuits are known in motor vehicles, for example for the purposes of cooling an internal combustion engine. Here, a heat source for cooling, a pump for circulating the cooling fluid and a radiator for cooling the cooling fluid are provided in a cooling circuit. It is also possible for multiple heat sources to be cooled if necessary.

In electric vehicles with at least one electric motor as drive motor, the electric motor as drive motor must typically also be cooled, and also the energy storage which feeds the electric motor must be cooled as required. The incorporation of both heat sources, that is to say electric motor and energy storage, into the cooling circuit does not provide optimum cooling, because the target temperatures and the heat quantity to be dissipated differ considerably for the two heat sources.

SUMMARY OF THE INVENTION

Described herein is a cooling circuit arrangement which allows improved cooling of at least two heat sources and a method for controlling a cooling circuit arrangement, by means of which method optimum utilization of the cooling circuit arrangement is made possible.

An exemplary embodiment of the invention relates to a cooling circuit arrangement having a first closed cooling circuit and having a second closed cooling circuit, wherein a first heat source, a first pump and a first radiator are provided in the first cooling circuit, wherein, by means of the first pump, a coolant can be conveyed to the first radiator and can be conveyed from the first radiator to the first heat source and from the latter to the first pump, wherein an expansion tank for the coolant is provided in the first cooling circuit, wherein a second heat source, a second pump and a second radiator are provided in the second cooling circuit, wherein, by means of the second pump, a coolant can be conveyed to the second radiator and can be conveyed from the second radiator to the second heat source and from the latter to the second pump, wherein, downstream of the first pump and of the second pump, there is provided a first fluidic connection which is controllable by means of a first valve, and wherein, upstream of the first pump and the second pump, there is provided a second fluidic connection which is controllable by means of a second valve. In this way, it is possible for a pressure adaptation or a pressure equalization to be performed in a manner dependent on the pressure ratio in the first and/or in the second cooling circuit, wherein it is possible in targeted fashion to set a defined pressure level between that in the first and in the second cooling circuit.

It is particularly advantageous if the coolant in the first cooling circuit has a lower temperature than the coolant in the second cooling circuit. The first cooling circuit is preferably a so-called low-temperature cooling circuit, and the second cooling circuit is a so-called medium-temperature or high-temperature circuit.

It is advantageous here if the temperature of the coolant in the first cooling circuit at the outlet of the first radiator is lower than the temperature of the coolant in the second cooling circuit at the outlet of the second radiator. Here, the temperature difference is at least 10° C. or greater, preferably at least 20° C. or greater. Effective cooling of each of the heat sources for cooling can thus be achieved.

It is also particularly advantageous if the first heat source is an electrical energy storage, in particular a rechargeable high-voltage battery. This can advantageously be warmed in the second circuit for example as medium-temperature circuit.

It is also advantageous if the second heat source is an electric drive, in particular at least one electric drive motor. This can advantageously be cooled in the first circuit as low-temperature circuit.

It is particularly advantageous if an expansion tank for the coolant is provided in parallel with respect to the first heat source. The expansion tank can implement a separation between a liquid phase and an air phase, such that, in the presence of negative relative pressure, air is drawn in, and in the presence of positive pressure, air is discharged. As a result, the pressure in the reservoir tank is typically between 0 and 1 bar above ambient pressure.

It is also advantageous if the first valve is arranged in the first cooling circuit and opens or shuts off the first fluidic connection to the second cooling circuit, and/or wherein the second valve is arranged in the second cooling circuit and opens or shuts off the second fluidic connection to the first cooling circuit. In this way, a pressure equalization can be performed in a manner dependent on the pressure ratio in the cooling circuits or in at least one of the cooling circuits, in order that defined pressure conditions also prevail in the second cooling circuit. If the second cooling circuit were completely decoupled, the pressure level in the second cooling circuit would be undefined, wherein damage can occur if the pressure were too low or too high. Leaks or reduced cooling performance could also occur.

It is also advantageous if, in the second cooling circuit, there is provided a coolant pressure sensor which detects the pressure of the coolant, and/or means are provided for ascertaining the pressure of the coolant in the second cooling circuit. Targeted control can thus be performed.

It is also advantageous if a control device is provided for opening or shutting off the first valve and/or the second valve in controlled fashion.

An exemplary embodiment of the invention relates to a method for controlling a cooling circuit arrangement, wherein the first and/or the second valve is controlled in a manner dependent on data from the pressure sensor and/or on the pressure ascertainment, wherein the data are taken into consideration for the opening or shutting-off of the first valve and/or of the second valve.

BRIEF DESCRIPTION OF THE DRAWING FIGURES

Figure 2:
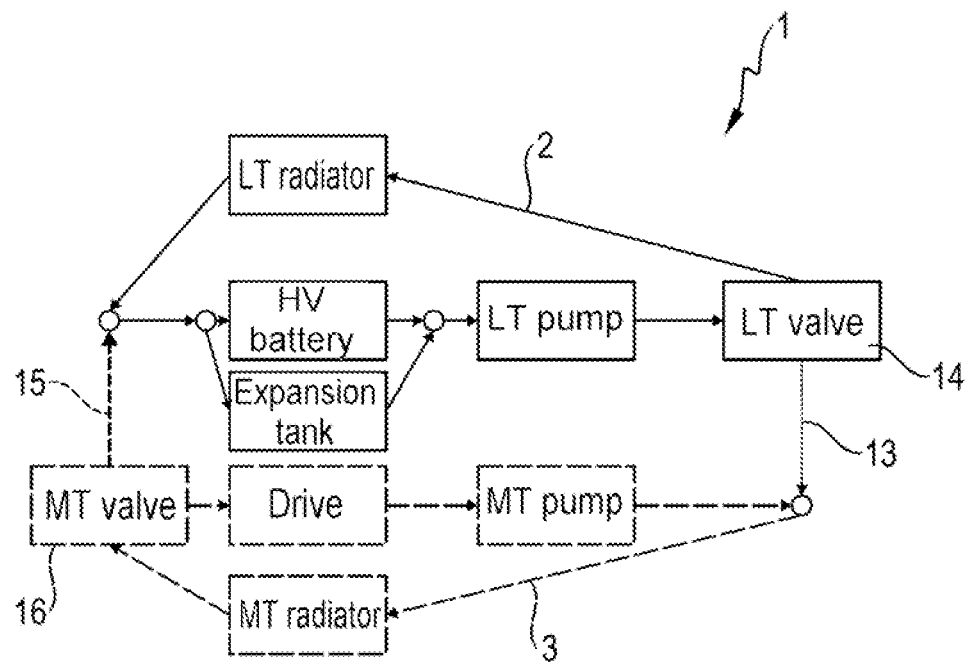
Figure 3:
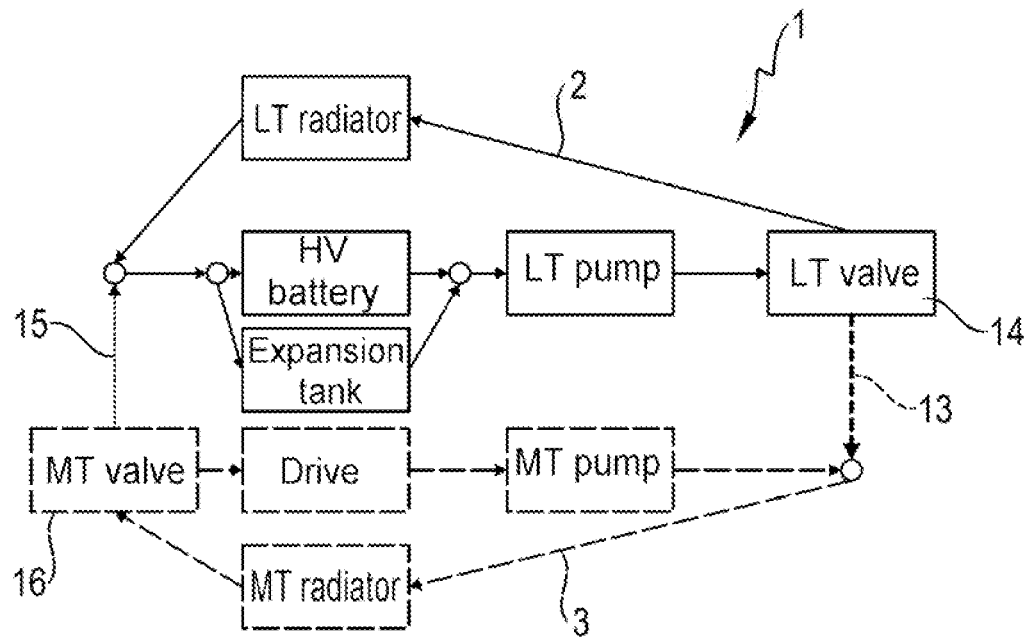
Figure 4:
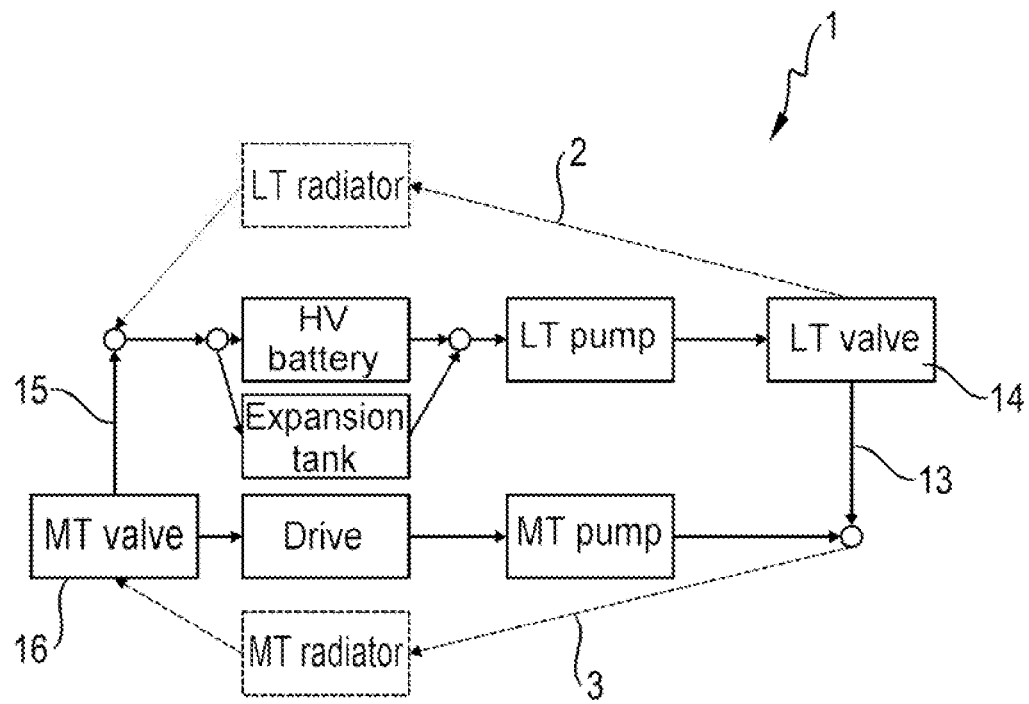

Below, the invention will be discussed in detail on the basis of an exemplary embodiment and with reference to the drawing. In the drawing:

FIG. 1 is a schematic illustration of a cooling circuit arrangement according to aspects of the invention in a first operating state with independent cooling circuits, FIG. 2 is a schematic illustration of a cooling circuit arrangement according to aspects of the invention in a second operating state with cooling circuits coupled on a low-pressure side, FIG. 3 is a schematic illustration of a cooling circuit arrangement according to aspects of the invention in a third operating state with cooling circuits coupled on a high-pressure side, and FIG. 4 is a schematic illustration of a cooling circuit arrangement according to aspects of the invention in a fourth operating state with cooling circuits coupled on the low-pressure side and on the high-pressure side.

DETAILED DESCRIPTION OF THE INVENTION

FIGS. 1 to 4 show a cooling circuit arrangement 1 with two cooling circuits, a first cooling circuit 2 and a second cooling circuit 3.

Here, the cooling circuit arrangement 1 comprises at least a first closed cooling circuit 2 and a second closed cooling circuit 3.

In the exemplary embodiment, the first cooling circuit 2 is a low-temperature circuit and, in the exemplary embodiment, the second cooling circuit 3 is a medium-temperature circuit. This means that the coolant in the first cooling circuit 2 has a lower temperature than the coolant in the second cooling circuit 3. Here, the temperature of the coolant in the first cooling circuit 2 at the outlet of the first radiator 4, which is a low-temperature radiator, is for example lower than the temperature of the coolant in the second cooling circuit 3 at the outlet of the second radiator 5, which is a medium-temperature radiator.

Here, a first heat source 8, a first pump 7 and a first radiator 4 are provided in the first cooling circuit 2, wherein, by means of the first pump 7, a coolant can be conveyed to the first radiator 4 and can be conveyed from the first radiator 4 to the first heat source 8 and from said first heat source 8 back to the first pump 7.

In the exemplary embodiment shown, the first heat source 8 is an electrical energy storage, in particular a rechargeable high-voltage battery.

It can furthermore also be seen that an expansion tank 9 for the coolant is provided in the first cooling circuit 2, which expansion tank is optionally provided in parallel with respect to the first heat source 8.

A second heat source 12, a second pump 11 and a second radiator 5 are provided in the second cooling circuit 3. Here, by means of the second pump 11, a coolant is conveyed to the second radiator 5 and is conveyed from the second radiator 5 to the second heat source 12 and from the latter back to the second pump 11.

In the exemplary embodiment, the second heat source 12 is an electric drive, in particular at least one electric drive motor.

Here, downstream of the first pump 7 and of the second pump 11, there is provided a first fluidic connection 13 which is controllable by means of a first valve 14. Also, upstream of the first pump 7 and the second pump 11, there is provided a second fluidic connection 15 which is controllable by means of a second valve 16. In this way, the two independent cooling circuits 2, 3 can be connected to one another or separated.

FIG. 1 shows that the first valve 14 is arranged in the first cooling circuit 2 and opens or shuts off the first fluidic connection 13 to the second cooling circuit 3.

FIG. 1 also shows that the second valve 16 is arranged in the second cooling circuit 3 and opens or shuts off the second fluidic connection 15 to the first cooling circuit 2.

In this way, it is selectively possible for no fluidic connection 13, 15 between the cooling circuits 2, 3 to be opened, or for only the first fluidic connection 13 or only the second fluidic connection 15 or both fluidic connections 13, 15 to be opened. In this way, the second cooling circuit 3 can be brought to the pressure level of the first cooling circuit 2 in targeted fashion.

It is preferable if, in the second cooling circuit 3, there is provided a coolant pressure sensor 17 which detects the pressure of the coolant, and/or that means are provided in order to ascertain the pressure of the coolant in the second cooling circuit 3. These data from the sensor and/or the ascertained data serve for the control of the valves 14, 16.

Correspondingly, a control device 18 is provided for opening or shutting off the first valve 14 and/or the second valve 16 in controlled fashion.

Here, a method for controlling a cooling circuit arrangement 1 is performed, wherein the first and/or the second valve 14, 16 is controlled in a manner dependent on data from the pressure sensor 17 and/or on the pressure ascertainment, wherein the data are taken into consideration for the opening or shutting-off of the first valve 14 and/or of the second valve 16.

In FIG. 1, the valves 14, 16 are closed, such that the two cooling circuits 2, 3 are not fluidically connected to one another.

In FIG. 2, the valve 16 is open and the valve 14 is closed, such that a second fluidic connection 15 is provided.

In FIG. 3, the valve 14 is open and the valve 16 is closed, such that a second fluidic connection 13 is provided.

In FIG. 4, the valves 14, 16 are open, such that the two cooling circuits 2, 3 have a twofold fluidic connection to one another.

What is claimed:

1. A cooling circuit arrangement comprising:
a first closed cooling circuit including a first heat source, a first pump, a first radiator, and an expansion tank for coolant, wherein the first closed cooling circuit is arranged such that the first pump is configured to convey coolant to the first radiator and then to the first heat source and then back to the first pump;
a second closed cooling circuit including a second heat source, a second pump and a second radiator, wherein the second closed cooling circuit is arranged such that the second pump is configured to convey coolant to the second radiator and then to the second heat source and then back to the second pump;
a first fluidic connection which is controllable by a first valve, the first fluidic connection being located downstream of the first pump and the second pump; and
a second fluidic connection which is controllable by a second valve, the second fluidic connection being located upstream of the first pump and the second pump.

2. The cooling circuit arrangement as claimed in claim 1, wherein the coolant in the first cooling circuit has a lower temperature than the coolant in the second cooling circuit.

3. The cooling circuit arrangement as claimed in claim 2, wherein the temperature of the coolant in the first cooling circuit at an outlet of the first radiator is lower than the temperature of the coolant in the second cooling circuit at an outlet of the second radiator.

4. The cooling circuit arrangement as claimed in claim 1, wherein the first heat source is a rechargeable high-voltage battery.

5. The cooling circuit arrangement as claimed in claim 1, wherein the second heat source is at least one electric drive motor.

6. The cooling circuit arrangement as claimed in claim 1, wherein the expansion tank is arranged in parallel with respect to the first heat source.

7. The cooling circuit arrangement as claimed in claim 1, wherein the first valve is arranged in the first cooling circuit and is configured to either open or close the first fluidic connection to the second cooling circuit, and/or wherein the second valve is arranged in the second cooling circuit and is configured to either open or close the second fluidic connection to the first cooling circuit.

8. The cooling circuit arrangement as claimed in claim 1, wherein the second cooling circuit further comprises (i) a coolant pressure sensor that is configured to detect a pressure of the coolant in the second cooling circuit, and/or (ii) means for ascertaining the pressure of the coolant in the second cooling circuit.

9. The cooling circuit arrangement as claimed in claim 1, further comprising a control device that is configured for opening or closing the first valve and/or the second valve in a controlled fashion.

10. In a cooling circuit arrangement including (i) a first closed cooling circuit including a first heat source, a first radiator, and a first pump configured to convey coolant to the first radiator and then to the first heat source and then back to the first pump, (ii) a second closed cooling circuit including a second heat source, a second radiator, a second pump configured to convey coolant to the second radiator and then to the second heat source and then back to the second pump, and means for ascertaining the pressure of the coolant in the second cooling circuit, (iii) a first fluidic connection which is controllable by a first valve, the first fluidic connection being located downstream of the first pump and the second pump, and (iv) a second fluidic connection which is controllable by a second valve, the second fluidic connection being located upstream of the first pump and the second pump, a method for controlling the cooling circuit arrangement comprises:

controlling the first and/or the second valve in a manner dependent on data from the means for ascertaining the pressure, wherein the data are taken into consideration for the opening or closing of the first valve and/or of the second valve.

\* \* \* \* \*